June 25, 1940.   C. B. GARWOOD   2,205,382
METHOD OF MAKING HOLLOW GLASSWARE
Filed May 19, 1938   2 Sheets-Sheet 1

Charles B. Garwood
INVENTOR.

BY *CRSnowLeo.*
ATTORNEYS.

June 25, 1940.   C. B. GARWOOD   2,205,382
METHOD OF MAKING HOLLOW GLASSWARE
Filed May 19, 1938   2 Sheets-Sheet 2

Charles B. Garwood
INVENTOR.
BY
ATTORNEYS.

Patented June 25, 1940

2,205,382

UNITED STATES PATENT OFFICE 2,205,382

METHOD OF MAKING HOLLOW GLASSWARE

Charles B. Garwood, Linthicum Heights, Md., assignor to Carr-Lowrey Glass Co., Baltimore, Md.

Application May 19, 1938, Serial No. 208,901

4 Claims. (Cl. 49—80)

This invention relates to a method of producing hollow glassware.

An object of the invention is to eliminate much of the apparatus heretofore found essential, it being possible, by means of the present method, to produce glass bottles or other containers without the use of parison molds or neck rings and without the necessity of transferring a parison from one mold to another.

A further object is to provide a method whereby the glass container produced thereby can be formed with projecting portions or any desired ornamentation wherever found to be advantageous upon the body of the container.

With the foregoing and other objects in view which will appear as the description proceeds, the invention resides in certain new and novel steps of the method as hereinafter described, it being understood that changes may be made without departing from the scope of the invention as claimed.

In the accompanying drawings the several steps performed in carrying out the method of making a glass container, have been illustrated.

In said drawings

In carrying out the method constituting the present invention a single finishing mold 1 is employed, this being provided with a cavity 2 the wall of which is so shaped that any desired ornamentation, projections or depressions can be formed in the container produced in the mold. For example, and as shown in Figures 1 to 6 inclusive, opposed recesses 3 can be provided in the wall of the mold whereby lugs or handles can be produced on the finished container at points between the bottom and shoulder portion of the container.

Figure 1:
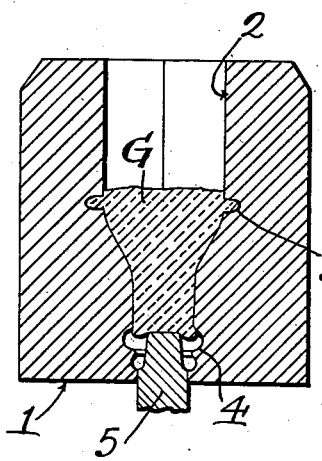
Figure 1 is a section through a finishing mold, which is the only mold used in the formation of hollow glassware by the present method, a portion of the corkage plug or neck pin being shown in position and a gob of glass also being shown after it has been dropped into the open mold.
Figure 2:
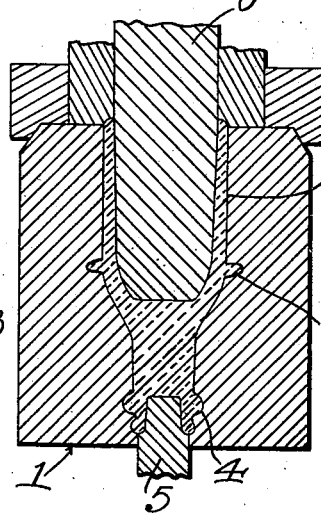
Figure 2 is a section through the mold and the plunger therein, illustrating the second step of the method wherein a plunger is directed into the mold cavity so as to spread the glass upwardly therearound.
Figure 3:
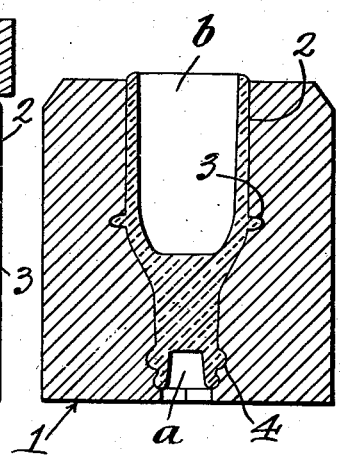
Figure 3 is a section through the mold illustrating the third step of the method wherein the plunger is withdrawn from the mold, leaving the glass with a cavity the proportions of which are determined by the shape and size of the withdrawn plunger.

The mold 1 is not used in connection with a neck ring. Instead the neck finish is adapted to be produced in the bottom portion of the cavity as indicated at 4 and a corkage plug or neck pin 5 is designed to move into and out of this lower portion of the cavity. After the corkage plug 5 has been placed in proper position, as shown in Figure 1, a gob of glass of proper proportions is dropped into the cavity 2 as indicated at G. Thereafter a plunger 6 is moved downwardly into cavity 2 and into the gob of glass, forcing portions of the glass into the lower end 4 of the cavity so as to produce the desired neck finish and also causing portions of the glass to fill the cavities 3 and to extrude upwardly around the plunger until the top of the mold is reached. The proportions of the plunger and the amount of glass deposited in the mold must be such that when the plunger reaches a predetermined depth in cavity 2, the displaced glass will completely fill the space surrounding the plunger and up to the top of the mold. Thus when the plunger is withdrawn and the corkage plug likewise removed from the mold, the glass will have assumed the preliminary shape shown in Figure 3 with a bottom or neck cavity a and a top or main cavity b.

Following the withdrawal of the plunger 6, a movable baffle 7 is directed into cavity b. This baffle can be made hollow with small apertures 8 in its lower end and said lower end can be shaped to produce the desired contour of the bottom of the bottle.

Whereas plunger 6 is preferably slightly tapered toward its lower end so as to be quickly disengaged from the glass surrounding it when the plunger is moved upwardly, the baffle 7 is preferably cylindrical so as to be slightly spaced annularly from the initially formed glass in the mold.

Figure 4:
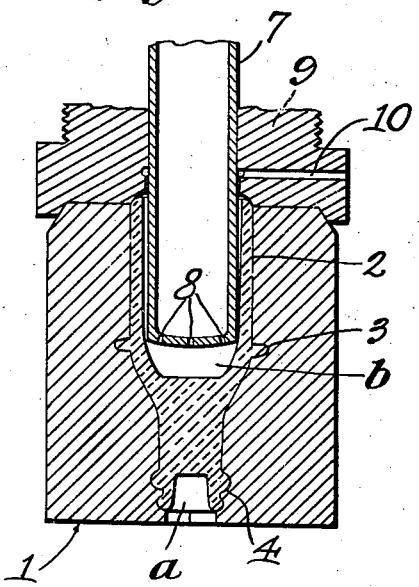
Figure 4 is a section through the mold and a baffle therein, illustrating the fourth step of the method wherein a movable baffle is inserted into the formed cavity in the initially shaped glass.
Figure 5:
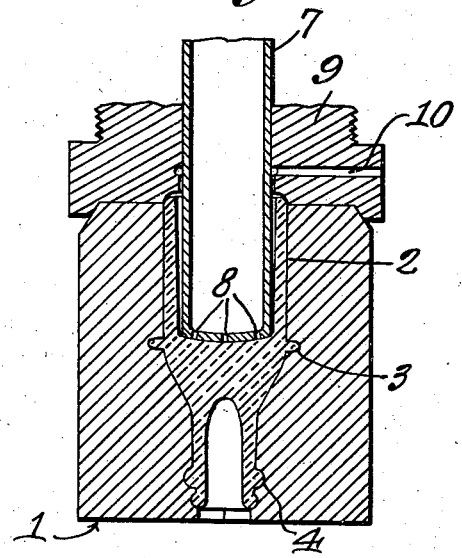
Figure 5 is a section through the mold and baffle, illustrating the following step of the method wherein the baffle is caused to recede while air is flowing into the glass by way of the cavity left by the withdrawn corkage plug or neck pin.
Figure 6:
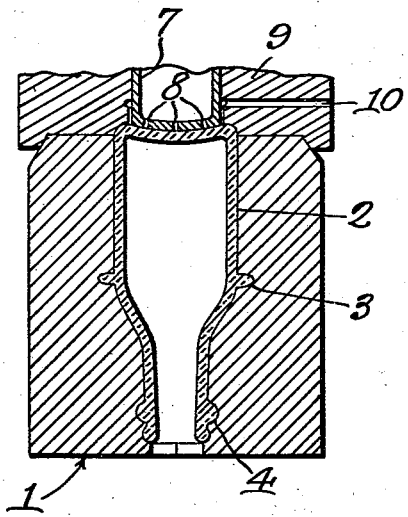
Figure 6 is a section through the mold and a portion of the baffle, showing the completion of the method, the bottle being completely blown and the withdrawn movable baffle being positioned on the bottom of the completed container.

Following the positioning of the baffle in the cavity b as shown in Figure 4, compressed air may be introduced into the neck portion from which the corkage plug or neck pin has been removed or retracted. This air sweeps the hot glass ahead of it and out of the neck, the bubble of air following the line of least resistance. If no baffle were employed in the mold, the compressed blowing air would break through the plastic glass above the neck portion of the article being formed. The baffle has been provided to overcome this objectionable feature and it also serves as a means for determining the thickness of the bottom of the finished bottle in the center. As the glass is subjected to pressure from the air, it is forced from the neck and shoulder portion of the mold into contact with the receding baffle or this contact can be effected by vacuum. This is shown in Figure 5. As the baffle recedes toward the upper limit of its movement, the glass first to contact with the baffle at the bottom thereof follows the receding baffle to its raised position. The remaining hot glass which did not come into contact with the baffle will flow upwardly and spread out evenly over the originally pressed side wall of cavity b until the formation of the baffle is completed, as shown in Figure 6, it being noted that the end of the baffle and the follower ring 9 cooperate to shape the bottom of the bottle. Following the completion of the operation as shown in Figure 6, the mold 1 is opened and the finished bottle removed.

By providing the openings in the end of the tubular baffle as indicated at 8, air is free to escape from between said baffle and the surface of the cavity b. These openings are also used where suction is employed to bring the glass into contact with the end of the baffle. An additional vent may be employed as shown at 10 for the flow of air from around the baffle.

Figure 7:
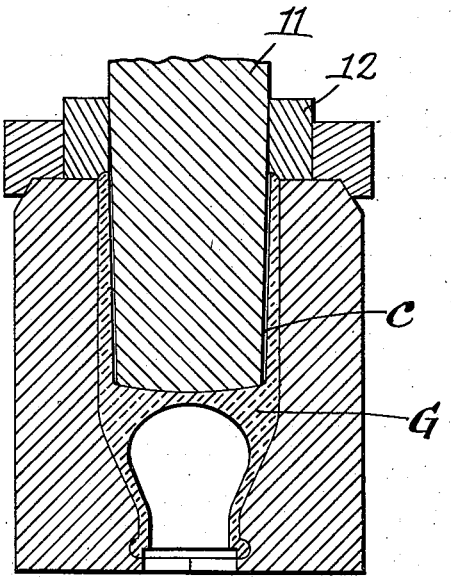
Figure 7 is a section similar to Figure 2 showing the first step of a method whereby the plunger used for initially shaping the glass can also be used as a movable baffle, said plunger being shown after it has moved a short distance upwardly from its lower limit following the extrusion of the glass upwardly about the combined plunger and baffle.
Figure 8:
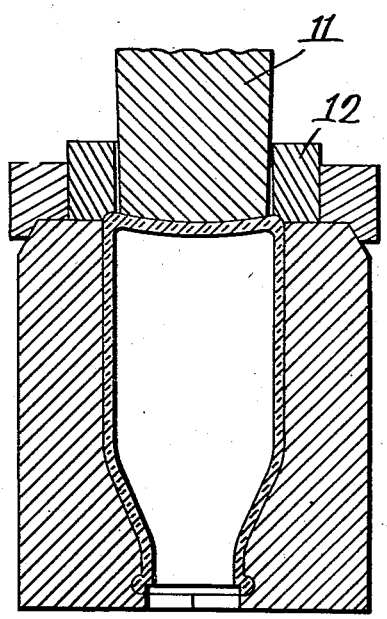
Figure 8 is a section similar to Figure 7 showing the plunger baffle raised to the upper limit of its movement at the completion of the formation of the container.

Instead of using both a plunger and a baffle, as shown in Figures 2 to 6 inclusive, the plunger can be employed as the baffle as shown in Figures 7 and 8. Under these conditions the cavity c is formed in the glass G by the plunger 11 as heretofore explained and as said plunger is withdrawn toward the position shown in Figure 8, the air flowing under pressure into the neck portion of the mold will cause the glass to flow upwardly and spread as already explained, the follower ring 12 cooperating with the lower end of the plunger to produce a bottom of desired contour.

The herein described method of producing hollow glassware has many advantages over other methods. Of primary importance is the fact that only one mold is required, this being the finishing mold.

No transfer mechanism is necessary and, therefore, the mechanism is greatly simplified.

Although containers of considerable depth can be produced by the method herein described, the walls will be of uniform thickness and, consequently, can be more easily annealed than where they are of varying thickness.

By following the herein described method, the inside contour of the container need not be the same as that of the outside contour and, as a result of the initial pressing operation used in carrying out this method, it is possible to produce solid glass lugs, protecting rings and the like on bodies and to produce a sharpness of lettering or ornamentation not heretofore possible by any of the methods of production used.

By means of this method the speed of production can be greatly increased because the glass is pressed into contact with the mold and the heat transfer is started as soon as the gob is placed in the mold.

Obviously the plunger, corkage plug and baffle can be of any desired shape or design for the purpose of producing results not possible heretofore.

What is claimed is:

1. The method of producing a blank and a finished article of hollow glassware by successive operations in a single mold which includes the step of forcing an element in one direction into a gob of glass contained in said mold, thereby to displace portions of the gob to produce a recess the size of which determines the capacity of the finished article and shape the external surfaces of the glassware, and then retracting said element and blowing the gob simultaneously in the direction in which said element is moving thereby to form a completed article with walls of substantially predetermined thickness.

2. The method of producing a blank and a completed article of hollow glassware by successive operations in a single mold which includes the step of forming chilled neck and wall portions by pressing a gob of glass in the mold to spread portions thereof over the walls of the mold and form a recess in the glass, the size of said recess determining the capacity of the completed article, then maintaining a portion of the glass in contact with a baffle in the recess, thereby to chill said portion and shape the bottom of the glassware, and then causing the glass-engaged surface of the baffle to recede from its recess while air under pressure is being directed into glass at the other end of the mold, thereby to spread over the chilled wall portions of the glassware the glass remaining unchilled in the mold.

3. The method of producing a blank and a finished article of hollow glassware by successive operations in a single mold which includes the step of forcing an element into a gob of glass in said mold thereby extruding portions of the gob about the element and over the surface of the mold to shape and chill those portions of the glass contacting with the mold and forming a recess in the gob the size of which determines the capacity of the finished article, and then blowing the gob and withdrawing said element simultaneously and in the same direction to complete the formation of the glassware.

4. The method of producing a blank and a finished article of hollow glassware by successive operations in a single mold which includes the step of depositing a gob of glass in the mold, and subsequently forcing a baffle into and withdrawing it from the glass thereby to compress the glass in the mold and form a recess the size of which determines the capacity of the article when completed, and directing air into the glass during the withdrawal of the baffle to complete the article, said baffle constituting means for closing the mold until the blowing of the article is completed.

CHARLES B. GARWOOD.